United States Patent [19]

Elsel

[11] 4,274,022
[45] Jun. 16, 1981

[54] EVACUATING DEVICE FOR GENERATING AN INSULATING VACUUM AROUND THE SUPERCONDUCTING WINDING OF A ROTOR

[75] Inventor: Werner Elsel, Erlangen, Fed. Rep. of Germany

[73] Assignee: Siemens Aktiengesellschaft, Berlin & Munich, Fed. Rep. of Germany

[21] Appl. No.: 39,654

[22] Filed: May 16, 1979

[30] Foreign Application Priority Data

Jun. 16, 1978 [DE] Fed. Rep. of Germany ....... 2826501

[51] Int. Cl.³ .............................................. H02K 9/00
[52] U.S. Cl. ....................................... 310/62; 310/53; 310/63; 310/64; 62/55.5; 417/49
[58] Field of Search ...................... 310/10, 52, 58–61, 310/40, 64, 62, 63; 62/55.5; 417/49, 48, 50, 51

[56] References Cited

U.S. PATENT DOCUMENTS

| | | | |
|---|---|---|---|
| 3,648,082 | 3/1972 | MacNab | 310/10 |
| 3,679,920 | 7/1972 | MacNab | 310/10 |
| 3,781,133 | 12/1973 | Hall | 417/49 |
| 3,994,625 | 11/1976 | Welch | 417/49 |
| 4,085,343 | 4/1978 | Hasegawa | 310/261 |
| 4,096,403 | 6/1978 | Rabinowitz | 310/10 |

*Primary Examiner*—R. Skudy
*Attorney, Agent, or Firm*—Kenyon & Kenyon

[57] ABSTRACT

An evacuating device for generating an insulating vaccum around the superconducting winding of the rotor of an electric machine with an inner space which is surrounded by the winding and is permeated by the magnetic field of the winding in which a co-rotating ionization getter pump operating according to the sputter principle is diposed in the inner space and has at least two electrodes arranged perpendicular with respect the magnetic field eliminating the need for rotating sealing elements at a terminal head of the rotor.

6 Claims, 4 Drawing Figures

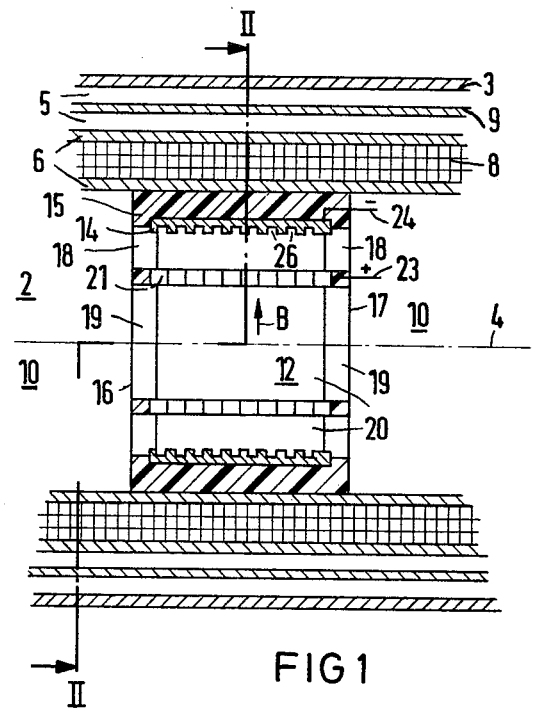
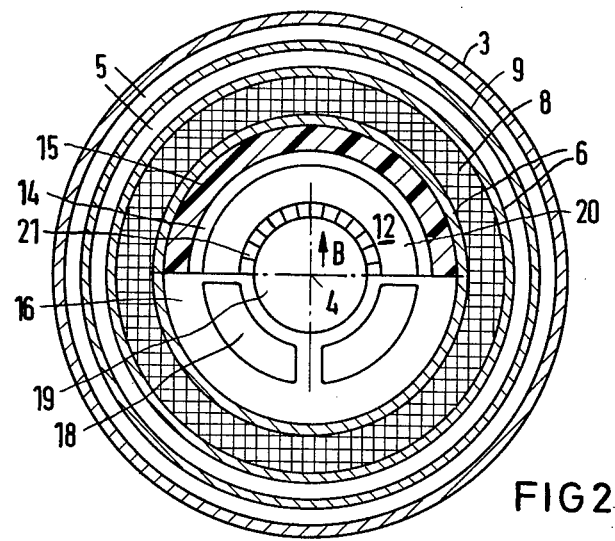

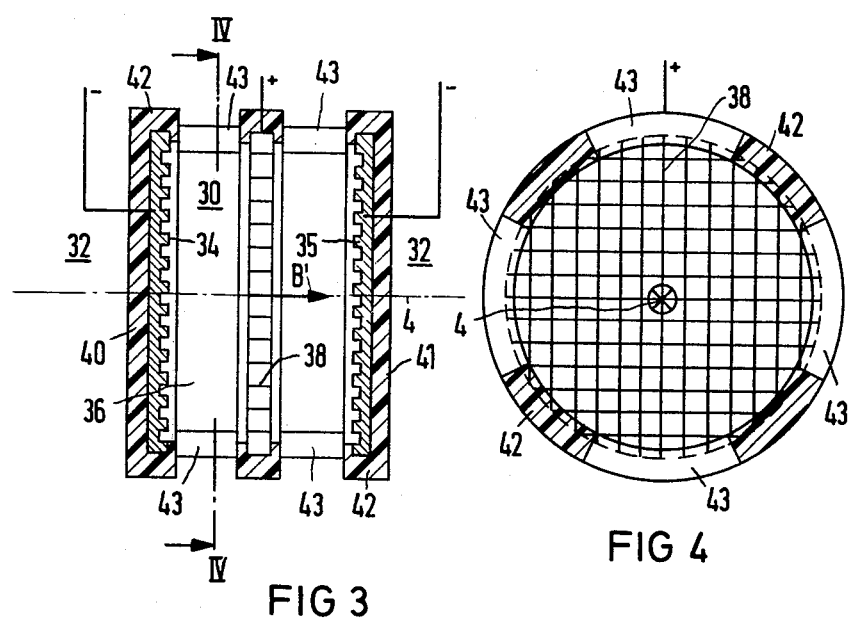

EVACUATING DEVICE FOR GENERATING AN INSULATING VACUUM AROUND THE SUPERCONDUCTING WINDING OF A ROTOR

BACKGROUND OF THE INVENTION

This invention relates to superconducting windings in general and more particularly to an evacuating device for generating an insulating vacuum around the superconducting winding of the rotor of an electric machine with an interior which is surrounded by the winding and is permeated by the magnetic field of the winding.

The superconducting field winding of the rotor of an electric machine, for instance, of a turbo-generator, is generally cooled with liquid helium. In order to limit the heat transfer from the outside to this deeply cooled winding, it is advantageous to surround the winding with an insulating vacuum which should in general be better than $10^{-6}$ mbar. While all gas components with the exception of the helium are bound to the surface portions of the rotor at the low helium temperature, due to a cyro pump effect because of the cooling with liquid helium, the insulating vacuum is worsened by helium leaks of the helium carrying rotor parts, especially at soldered or welded joints. For the helium carrying parts of the machine, the leakage rate would have to be less than $10^{-10}$ mbar. l/sec with an operating time of the machine of one year, in order for it to be unnecessary to pump helium out of the insulating vacuum. Such low leakage rates can be achieved, however, only with very large expenditure with respect to design costs in the choice of materials and in fabrication costs. In general, the leakage rates for the helium carrying parts are around $10^{-8}$ mbar. l/sec. With an extended operating time of, say, one year, an excessively large pressure increase of the insulating vacuum is then obtained. With this leakage rate, the pressure in a vacuum volume of 1000 l rises, for instance, to $10^{-4}$ mbar in less than a year. It is therefore necessary to pump the helium gas out of the vacuum space during the rotating operation. For this purpose, for instance, a centrally arranged evacuating tube, via which the vacuum space can be evacuated by means of a pump arranged outside the rotor, is generally provided in the terminal head of the rotor of the electric machine. To connect the rotating evacuating tube to the stationary pump line of the pump, a rotating sealing element must then also be provided at the terminal head. Such sealing elements, however, can be made for the required high insulating vacuum only with a relatively large expenditure, and require maintenance.

SUMMARY OF THE INVENTION

It is therefore an object of the present invention to provide a high vacuum pump for the rotor of an electric machine with a superconducting field winding, for which such rotating sealing elements can be dispensed with in the operating condition of the machine.

According to the present invention, this problem is solved by providing at least one co-rotating ionization ion getter pump operating according to the sputter principle in the interior of the rotor. The ionization getter pump has at least two electrodes which are arranged at least approximately perpendicular relative to the direction of the magnetic field.

The operation of an ionization getter pump is described, for instance, in the book by M. Wutz. ("Theory and Practice of Vacuum Engineering")., Braunschweig 1965, pages 228 to 233. It consists essentially in that a cold discharge, initiated by field emission, is maintained between an anode and a cathode by means of an externally applied magnetic field; this discharge is fed by a d-c voltage of several kilovolts applied between the electrodes. The pumping mechanism is brought about because the positive gas ions, which are generated in the discharge by collision between the electrons and the gas molecules or atoms impinge on the cathode with high energy and are absorbed there. This pump effect is further enhanced by the fact that cathode material is at the same time sputtered by the impact of the high energy gas ions onto the cathode. The vapor so produced from the cathode material is then precipitated on the inside of the pump space and thus forms a thin, loose getter layer which is highly absorptive for the gases.

The advantages of designing the evacuating device in accordance with the present invention are, in particular, that rotating vacuum seals such as magnetic fluidic seals or cold ridged ring seals at the terminal head of the rotor can be dispensed with, as the insulating vacuum is maintained by the corotating pump which is arranged in its interior. Instead of a central evacuating tube, a central feed tube for liquid helium can then be provided at the terminal head. With such a central feed of the helium by means of a rotating gap seal, the thermal losses are many times smaller than they are, for instance, with a cold ridged ring seal.

According to a further embodiment of the evacuating device according to the present invention, its electrodes can advantageously be made at least approximately with rotational symmetry. Through this measure, an unbalance of the rotor body caused by these pump components is avoided.

BRIEF DESCRIPTION OF THE DRAWINGS

FIGS. 1 and 2 are longitudinal and transverse cross sections respectively of a first embodiment of an evacuating device according to the present invention inside a rotor of an electric machine.

FIGS. 3 and 4 are similar views of a second embodiment of such an evacuating device.

DETAILED DESCRIPTION OF THE INVENTION

In FIG. 1, a section of the middle portion of the rotor 2 of an electric machine, especially of a turbo-generator, is illustrated as a longitudinal cross section. The rotor 2 includes an outer hollow cylinder 3 which, together with end pieces at its end faces, not shown in the figure, forms a vacuum housing at room temperature and is connected to a shaft member which is supported so that it can rotate about an axis 4. In the vacuum space 5 enclosed by the hollow cylinder 3 and the end pieces, the rotor 2 contains a support cylinder 6, on the outside or inside of which a field winding 8 is arranged, for instance, in slots. Of this winding, only the elongated part parallel to the axis in the middle part of the rotor is indicated in the figure. The conductors of the winding contain superconductive material, so that liquid helium is provided as a coolant. The coolant is taken, for instance, from a refrigeration machine, not shown in the figure, and is introduced into the rotor 2 via a centrally arranged coolant feed tube and fed to the field winding 8 via radial feed lines. Because of the helium cooling of the field winding, the support cylinder 6 is likewise at a low temperature.

Since support cylinder 6 is inside the vacuum space 5, the introduction of heat from the hollow cylinder 3 into the superconducting field winding 8 is properly limited if a sufficient vacuum is maintained, for instance, less than $10^{-6}$ mbar. It is advantageous to also provide for this purpose a concentrically arranged, cooled radiation shield 9, which acts at the same time as damper winding between the field winding and a stator winding, not shown in the figure.

The axis-parallel parts of the field winding 8 shown in the figure produce, in the inner space 10, which is surrounded by the winding and is a central subspace of the vacuum space 5, a magnetic field which extends essentially perpendicular to the axis of rotation 4 of the rotor 2. The magnetic field is indicated by an arrow B. According to the present invention, it is utilized for the operation of an ionization getter pump 12 operating according to the sputter principle. This high vacuum pump, often also called an ion getter pump, maintains the insulating vacuum around the superconducting winding 8 and the support member 6. With, for instance, a diameter of 180 mm and a length of 70 mm of the pump, a suction capacity of about 10 l/s can be obtained. In the figure, the pump is shown exaggeratedly large for clarification in relation to the other rotor parts.

On its outside, this pump 12 contains a hollow cylindrical cathode 14 of titanium which surrounds the axis of rotation 4 concentrically and is arranged inside the support cylinder 6 via a mounting 15 of insulating material on its outside. This mounting also takes up and transmits the centrifugal forces acting on the pump 12 when the rotor 2 is in rotation. The two end faces of this mounting are disc-like parts 16 and 17, respectively, which are provided with axial cutouts 18 and 19. In the interior 20 of the pump, which is defined by the mounting and which, due to the cutouts 18 and 19, represents a subspace of the space 10, there is arranged, concentric to the cathode 14, between the two disc shaped parts 16 and 17 of the mounting 15, a hollow cylindrical anode 21 with a predetermined diameter. The two hollow cylindrical electrodes 14 and 21 of the pump are therefore arranged at least approximately perpendicular to the direction of the magnetic field B. Due to the rotationally symmetric design of the pump, its parts also cause no unbalance of the rotor.

A potential difference of several kilovolts is applied between the anode 21 and the cathode 14 via leads 23 and 24, which are only indicated in the figure. Then, a cold discharge, initiated by field emission, takes place between these two electrodes. The electrons generated thereby arrive at the anode via helical paths under the influence of the magnetic field B. This increases the probability considerably that a gas molecule or atom located between the electrodes will be ionized by an electron collision. The gas ions formed, which are charged positively, are accelerated toward the cathode by the voltage between anode and cathode. Upon impinging on the cathode, electrons are released from the latter on the one hand, which cause the discharge between the electrodes to be maintained. Furthermore, metal particles are knocked out of the cathode by cathode sputtering, which are precipitated on the adjacent walls of the pump as a getter deposit. Since the number of ions formed per unit time is essentially proportional to the pressure and the sputtered amount is essentially proportional to the number of ions arriving per unit time, this pump is practically self-regulating, i.e., the higher the pressure, and thereby, the gas accumulated, the more cathode material is sputtered.

The cathode sputtering removes cathode material. This continuously releases gases which had previously been bound to the cathode, especially helium gas. This effect is also called "memory effect". Since the ions striking the flanks of the cathode at an angle cause the largest amount of sputtering, the surface of the cathode 14 facing the anode 21 is made serrated, so that the surface is provided with circular grooves 26 arranged at regular spacings one behind the other in the direction of the axis. Thereby, more material is deposited than is sputtered in the depressed areas of the cathode. In the last analysis, most of the bound gas is covered up thereby and thus, the memory effect is largely attenuated.

The anode 21 is advantageously made in cellular form, so that each individual cell is practically a pump unit of its own.

FIG. 2 shows a cross section through the part of the rotor of the electric machine shown in FIG. 1 in the planes indicated by II—II. In this presentation, in particular, the large cutouts 18 and 19, which are provided at the end faces of the pump and connect the pump space 20 to the spaces 10 adjoining the pump are visible.

In FIG. 3, a further embodiment of an ion getter pump 30, according to the present invention is shown in a longitudinal section. This pump 30, is provided for the rotor, not detailed in the figure, of a machine with a superconducting field winding. It is arranged in spaces 32 which are surrounded by the field winding and are permeated by a magnetic field B' directed substantially parallel to the axis of rotation 4 of the rotor, contrary to the embodiment of the pump according to FIG. 1. Magnetic fields oriented in this way generally occur at the coil heads of the field winding of the rotor. Since the electrodes of the pump, which correspond in design substantially to the electrodes according to the pump of FIG. 1, are to be arranged at least approximately perpendicular to the direction of the magnetic field B', they are designed in the form of discs and are arranged in radial planes with respect to the axis of rotation 4. The pump contains two cathodes 34 and 35 between which an anode 38 with a cellular structure is arranged in a pump space 36. The surfaces of the cathodes 34 and 35 facing the anode are made serrated to reduce the memory effect. Both cathodes are advantageously at the same potential and are fastened to disc-shaped parts 40 and 41, respectively, of a mounting. This mounting, consisting of insulating material, at the same time transmits the centrifugal forces acting on the parts of the pump to a support member in which the field winding is located (not shown in the figure). A hollow cylindrical outer shell 42 of this mounting, the central part of which holds the anode 38 at the same time, is provided with radial cutouts 43, via which the pump space 36 of the pump is connected to the adjoining vacuum space.

FIG. 4 shows the pump according to FIG. 3 in a cross section in a section plane indicated by IV—IV.

To operate the ion getter pump of an evacuating device according to the present invention, it is generally necessary to first generate a rough vacuum in its pump space before the pump can operate. The necessary starting pressure, which is usually below $10^{-2}$ mbar, can be set either by cryocondensation due to the cooling of the field winding; or an external vacuum pump can be provided for this purpose which is connected to the terminal head of the standing rotor and then separated there-from when the starting pressure is reached. Therefore, no co-rotating vacuum seals are required, and the design of the terminal head of the rotor is simplified accordingly.

The high voltage of several kilovolts required to operate the ion getter pumps can be fed-in at the terminal head of the rotor via slip rings. Alternatively, transformer coupling and subsequent rectification by co-rotating diodes at the terminal head is possible.

For the rotor of an electric machine with a superconducting winding, several of the ion getter pumps shown in the figures can also be provided in an interior space surrounded by the winding. These pumps can then be designed as two electrode or also as three electrode pumps.

What is claimed is:

1. In an evacuating device for generating an insulating vacuum around the superconducting winding of the rotor of an electric machine with an inner space which is defined at its inner circumference by a support cylinder and is surrounded by the winding and is permeated by the magnetic field of the winding, comprising at least one ion getter pump operating according to the sputter principle, disposed in the inner space coupled to the support cylinder so as to co-rotate with the rotor, said pump having at least one anode electrode and at least a cathode electrode arranged at least approximately perpendicular with respect to the magnetic field in said space.

2. An evacuating device according to claim 1, wherein said electrodes have, at least approximately, symmetry of revolution.

3. An evacuating device according to claim 2, wherein said electrodes are arranged concentric to the axis of rotation of the rotor.

4. An evacuating device according to claim 1 wherein said anode electrode has a cellular structure.

5. An evacuating device according claim 1 wherein said cathode electrode has a surface facing the anode electrode which is serrated.

6. An evacuating device according to claim 1 wherein two cathode electrodes are disposed parallel to each of the two flat sides of an anode electrode.

* * * * *